(12) United States Patent
Hansen

(10) Patent No.: US 7,308,782 B2
(45) Date of Patent: Dec. 18, 2007

(54) METHOD AND DEVICE FOR THE PRODUCTION OF FILLED AND SEALED CONTAINERS

(76) Inventor: Bernd Hansen, Talstr. 22-30, 74429, Sulzbach-Laufen (DE)

( * ) Notice: Subject to any disclaimer, the term of this patent is extended or adjusted under 35 U.S.C. 154(b) by 0 days.

(21) Appl. No.: 10/574,086

(22) PCT Filed: Oct. 9, 2004

(86) PCT No.: PCT/EP2004/011328

§ 371 (c)(1),
(2), (4) Date: Mar. 30, 2006

(87) PCT Pub. No.: WO2005/037648

PCT Pub. Date: Apr. 28, 2005

(65) Prior Publication Data

US 2007/0006553 A1    Jan. 11, 2007

(30) Foreign Application Priority Data

Oct. 15, 2003   (DE) ................................ 103 47 907

(51) Int. Cl.
*B65B 3/02* (2006.01)
*B65B 9/24* (2006.01)

(52) U.S. Cl. ............................ 53/452; 53/140; 53/558; 53/561

(58) Field of Classification Search .................. 53/452, 53/558, 140, 561
See application file for complete search history.

(56) References Cited

U.S. PATENT DOCUMENTS

| | | | | |
|---|---|---|---|---|
| 3,251,915 A | * | 5/1966 | Pechthold | 53/140 |
| 3,357,046 A | * | 12/1967 | Pechthold | 53/140 |
| 3,669,602 A | * | 6/1972 | Hansen | 53/140 |
| 3,696,179 A | * | 10/1972 | Jacobs | 53/140 |
| 3,785,116 A | * | 1/1974 | Munz et al. | 53/140 |
| 3,863,424 A | * | 2/1975 | Naumann | 53/140 |
| 3,897,670 A | * | 8/1975 | Hansen | 53/140 |
| 4,107,362 A | * | 8/1978 | Valyi | 215/12.2 |
| 4,244,914 A | | 1/1981 | Ranalli et al. | |
| 4,510,115 A | * | 4/1985 | Gokcen et al. | 264/515 |
| 4,623,516 A | | 11/1986 | Weiler et al. | |
| 4,790,117 A | * | 12/1988 | Hansen | 53/140 |
| 4,919,855 A | | 4/1990 | Thomas | |
| 5,471,821 A | * | 12/1995 | Lindgren | 53/561 |
| 6,244,454 B1 | | 6/2001 | Yoshioka et al. | |

FOREIGN PATENT DOCUMENTS

| | | |
|---|---|---|
| DE | 2 324 711 | 12/1974 |
| DE | 27 03 527 | 8/1978 |
| DE | 34 42 092 | 5/1986 |
| DE | 199 25 097 | 12/2000 |
| FR | 1.491.316 | 8/1967 |
| GB | 2 281 245 | 3/1995 |
| WO | WO 03/031264 | 4/2003 |

* cited by examiner

*Primary Examiner*—Stephen F. Gerrity
(74) *Attorney, Agent, or Firm*—Roylance, Abrams, Berdo & Goodman, L.L.P.

(57) ABSTRACT

A method and a device for the production of filled and sealed containers involves a) a plastic tube that is extruded, b) at least one container which is impermeable to vapour and which is provided with one filling opening formed from the plastic tube, c) the filling product being introduced into the container through the filing opening and subsequently d) the filling opening being sealed by welding. The tube is made of at least one layer making the container impermeable to oxygen.

6 Claims, 2 Drawing Sheets

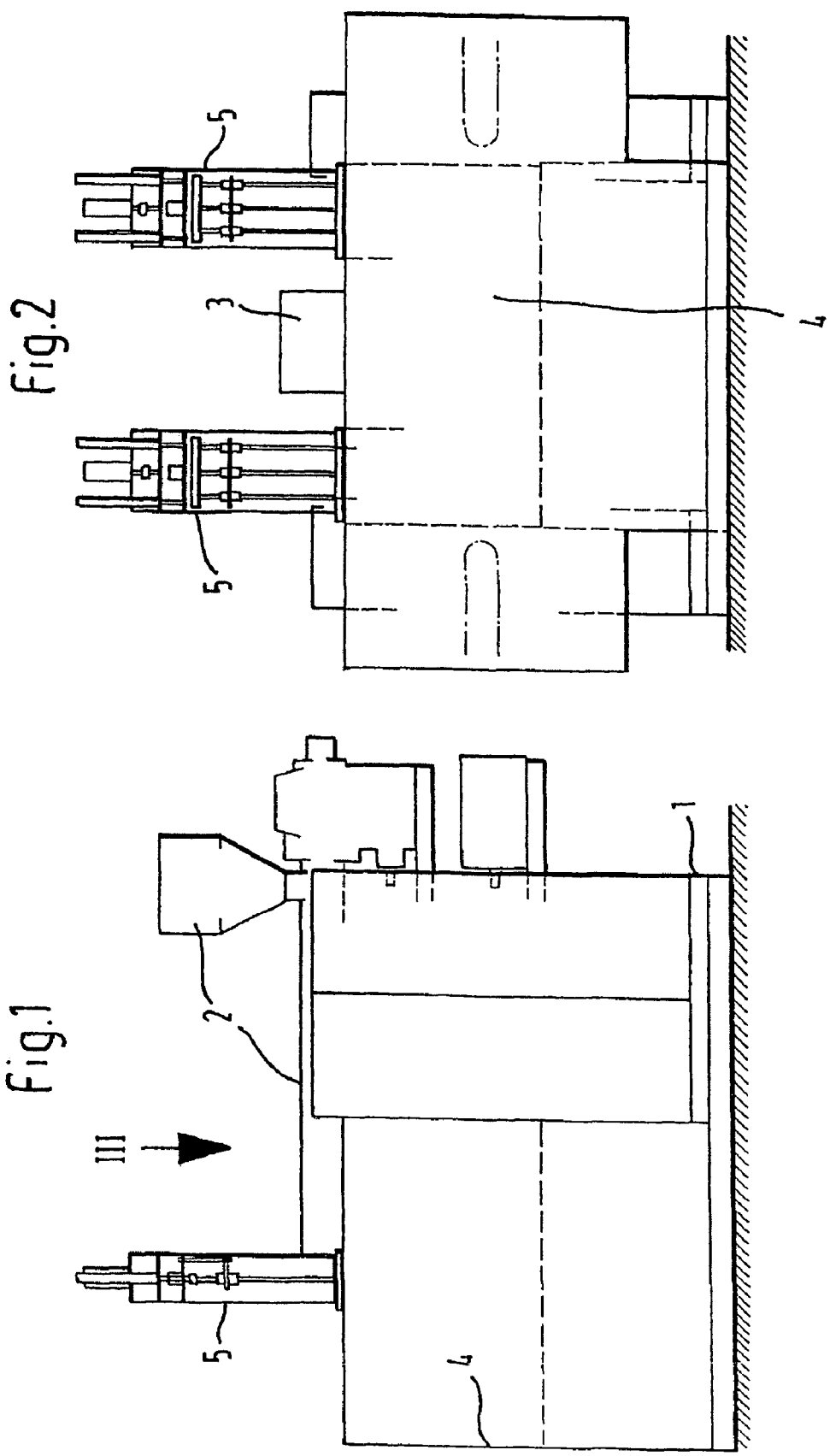

METHOD AND DEVICE FOR THE PRODUCTION OF FILLED AND SEALED CONTAINERS

FIELD OF THE INVENTION

The present invention relates to a method and device for the production of filled and sealed containers and a device for executing such method.

BACKGROUND OF THE INVENTION

The previously known process of filling and sealing containers makes it possible to economically produce, fill, and seal containers, even under aseptic conditions. It is therefore widely used. In all cases in which the contents are sensitive to oxygen, it is however necessary to provide either the container with repackaging or to use glass containers. Both alternatives greatly increase production costs.

SUMMARY OF THE INVENTION

An object of the present invention is to provide a process of filling and sealing containers which can also be used when the contents are sensitive to oxygen.

This object is achieved by a process in which the extruded tube is formed from at least one layer which makes the container impermeable to oxygen when the contents are sensitive to oxygen.

It is then not necessary to produce a blocking layer for oxygen by additional repackaging or using a glass container. If this layer is also able to meet other requirements required for the wall of the container, it is not necessary to provide coextrusion of at least two layers. In many cases, however, to meet the imposed requirements and/or for reasons of economy, it is advantageous to form the tube by coextrusion from two or more layers of materials with different properties.

With previously known machines for producing filled and sealed containers, only tubes which have a single layer can be extruded. Another object of the present invention is to provide a device which economically allows coextrusion.

This additional object is achieved by a device where the extrusion head and the pertinent extruder on the one hand and the blow-fill-seal means on the other hand are assigned to separate racks. Such assignment makes it possible to easily accommodate the increased number of components. Different extrusion units can then be combined with different blow-fill-seal means, enabling adaptation to different requirements without difficulty.

For purposes of the highest degree of flexibility, it is furthermore advantageous to make the control cabinet necessary for the power supply and control likewise as a separate unit. The separate unit can be set up in a location especially advantageous with respect to available space.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a side elevational view of a container filling and sealing device according to an exemplary embodiment of the present invention;

FIG. 2 is a front elevational view of the device of FIG. 1; and

DETAILED DESCRIPTION OF THE INVENTION

Figure 3:
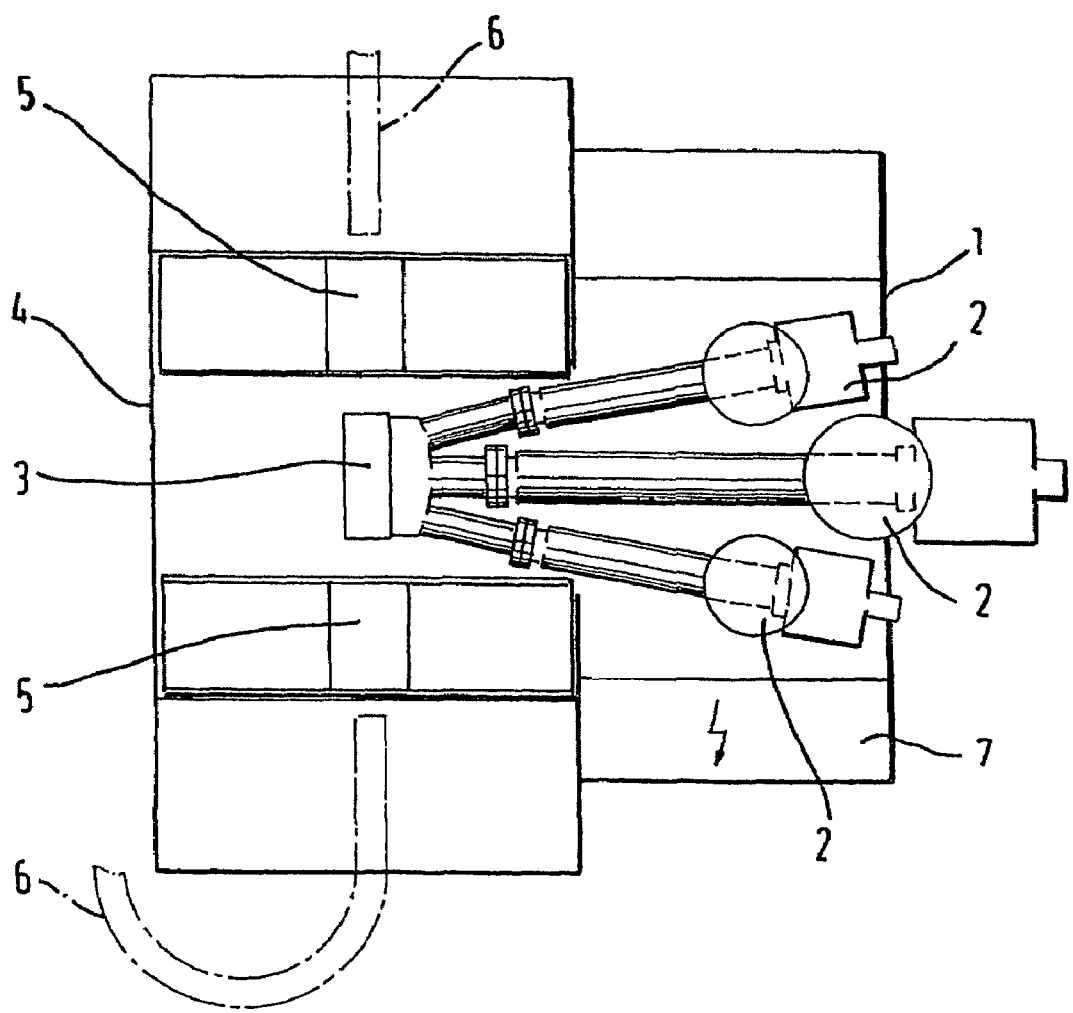
FIG. 3 is a top plan view of the device of FIG. 1.

A device for the production of filled and sealed containers, for example, ampules filled with a pharmaceutical preparation, according to an embodiment of the present invention, has a first rack 1 bearing the extruders 2, which can have a varied size, as shown in FIG. 3. In the exemplary embodiment, a larger extruder is between two smaller extruders. The extruders 2 are all at the height of the extrusion head 3 which, on its bottom, has an outlet opening for a tube. The extrusion head 3 is made such that coextrusion of three layers which jointly form the tube is possible. The tube head 3 is securely connected to the rack 1 by the extruders 2.

A second rack 4 is connected to that side of the frame or rack 1 above which the extruders 2 project. The rack 4 bears two blow-fill-seal means at a distance adjacent to each other, and both are made the same. Each of these two means has a blow mold divided in the vertical direction and positionable underneath the extrusion head 3.

After the tube emerging from the extrusion head 3 has reached a length such that its lower end extends to the lower end of the blow mold, the mold is closed. Instead of blowing the ampule or the ampules, filling and then sealing them in this position of the blow mold, as is conventional in the known devices, in the exemplary embodiment the tubing is cut off above the blow mold. The blow mold is moved from its position underneath the extruder head to a side position underneath the associated blowing and filling device 5. The two blowing and filling devices 5 are located, as shown in FIGS. 2 and 3, next to one side or the other of the extrusion head 3. At this point, the other blow mold is moved into the position underneath the extrusion head 3 at the same time in order to be able to accommodate an extruded tube there. Air for the blowing process is forced into the tube located in the other blow mold. This is followed by adding the contents through the still open head of the ampule or ampules. Only when filling is ended are the parts of the blow mold which mold the head moved together and the head of the ampule or ampules is/are finish-molded and sealed. Correspondingly, after the other blow mold has been pushed back into its initial position, one or more ampules are blown from the tube located in it and they are then filled and sealed.

The contents of the ampules are protected both against moisture and also against oxygen, because one of the layers comprising the wall of the ampules prevents oxygen from diffusing through. The other two layers form a water vapor barrier. Therefore, the ampules, after they have been ejected and excess plastic parts have been removed, need not be provided with barrier-forming repackaging. The two conveyor means 6 with which the finished ampules are removed are shown schematically in FIG. 3.

The power supply of all assemblies takes place by a control cabinet 7 which also contains all the controls. The control cabinet 7 is a separate component which can be set up wherever this is most advantageous. In the exemplary embodiment, the control cabinet 7 is next to the first rack 1 connected to the back of the second rack 4.

All features mentioned in the above specification as well as those that can be taken only from the drawing are components of the present invention as further embodiments, even if they are not particularly emphasized and not specifically mentioned in the claims.

While one embodiment has been chosen to illustrate the invention, it will be understood by those skilled in the art that various changes and modifications can be made therein without departing from the scope of the invention as defined in the appended claims.

What is claimed is:

1. A method for producing filled and sealed containers, comprising the steps of:
    extruding a plastic tube through an extrusion head by at least first, second and third extruders forming the plastic tube with at least three layers, at least one of the layers being impermeable to oxygen and at least one of the layers being impermeable to water vapor, the extrusion head having first and second opposite sides;
    locating first and second molds alternately below the extrusion head and blowing and filling devices located at respective sides of the extrusion head, the plastic tube being extruded into one of the molds when located below the extrusion head while a plastic tube previously extruded into the other of the molds is being molded into a container with a filling opening by air being blown into that plastic tube in the respective side of the extrusion head; and
    filling the formed container with contents through the filling opening and then welding the filled container to seal the filling opening of the container.

2. A method according to claim 1 wherein
    the layers are co-extruded to form the layers of the plastic tube.

3. A method according to claim 2 wherein
    more than three layers are co-extruded to form the plastic tube.

4. A method according to claim 2 wherein
    six layers are co-extruded to form the plastic tube.

5. An apparatus for producing filled and sealed containers, comprising:
    an extrusion head having first and second sides;
    first, second and third extruders coupled to said extrusion head to co-extrude multiple layers into a plastic tube, at least one of the layers being impermeable to oxygen, at least another of the layers being impermeable to water vapor;
    first and second racks, said extrusion head and said extruders being mounted on said first rack; and
    first and second blow-fill-seal devices mounted on said second rack for movement alternately below said extrusion head to receive the plastic tube and a side position in the respective side of said extrusion head such that one of said devices receives the plastic tube when below said extrusion head while another of the devices forms, fills and seals the container in the respective side position.

6. An apparatus according to claim 5 wherein
    a control cabinet contains controls coupled to said extruders and said devices.

* * * * *